United States Patent
Howell et al.

(10) Patent No.: US 7,424,642 B2
(45) Date of Patent: Sep. 9, 2008

(54) METHOD FOR SYNCHRONIZATION OF A CONTROLLER

(75) Inventors: Mark N. Howell, Rochester Hills, MI (US); Pradyumna K. Mishra, Gothenburg (SE)

(73) Assignee: GM Global Technology Operations, Inc., Detroit, MI (US)

( * ) Notice: Subject to any disclaimer, the term of this patent is extended or adjusted under 35 U.S.C. 154(b) by 331 days.

(21) Appl. No.: 11/409,870

(22) Filed: Apr. 24, 2006

(65) Prior Publication Data
US 2007/0250183 A1    Oct. 25, 2007

(51) Int. Cl.
| G06F 11/00 | (2006.01) |
| G06F 11/08 | (2006.01) |
| G06F 7/00 | (2006.01) |
| G06F 19/00 | (2006.01) |
| G05B 9/02 | (2006.01) |
| G05B 9/03 | (2006.01) |
| G01M 17/00 | (2006.01) |
| G01R 31/00 | (2006.01) |
| H03K 19/003 | (2006.01) |
| H03K 19/007 | (2006.01) |

(52) U.S. Cl. .............................. 714/12; 714/6; 714/13; 714/31; 714/797; 700/82; 701/33; 701/34; 702/59; 318/564; 326/11; 326/14

(58) Field of Classification Search ................... 714/2, 714/3, 5, 6, 7, 9, 10, 11, 12, 13, 25, 31, 797; 700/79, 82; 702/58, 59, 185; 701/29, 33, 701/34; 91/363 A, 509; 340/507, 508, 3.43; 326/10, 11, 14; 318/563, 564; 324/500; 327/526
See application file for complete search history.

(56) References Cited

U.S. PATENT DOCUMENTS

| 4,807,516 | A | * | 2/1989 | Takats ...................... 91/363 A |
| 5,274,554 | A | * | 12/1993 | Takats et al. .................. 701/33 |
| 5,295,258 | A | * | 3/1994 | Jewett et al. .................. 714/12 |
| 6,002,970 | A | * | 12/1999 | Abdelnour et al. ............ 700/82 |
| 6,438,707 | B1 | * | 8/2002 | Ronstrom .................... 714/13 |
| 6,550,018 | B1 | * | 4/2003 | Abonamah et al. ............. 714/6 |
| 6,732,300 | B1 | * | 5/2004 | Freydel ....................... 714/36 |
| 7,047,440 | B1 | * | 5/2006 | Freydel et al. ................ 714/11 |
| 2007/0198106 | A1 | * | 8/2007 | Schuster et al. ............... 700/79 |

* cited by examiner

*Primary Examiner*—Crystal Barnes-Bullock

(57) ABSTRACT

A system and method for reintegration of a redundant controller after occurrence of a fault is provided, comprising synchronizing outputs of a primary controller with outputs of secondary controllers. The controller is placed in a different mode of operation in which its output is not used in system control. A meta-controller is activated to drive the primary controller to the same states at which the secondary or redundant controllers operate. A voting mechanism is used to determine a fault in an output to a controlled device. Control of the device using the secondary outputs is effected. The primary controller recalculates the primary output, based upon the primary output; a feedback signal; and, the secondary outputs. Control using the primary output is permitted when the primary output is within an allowable range of the secondary outputs.

22 Claims, 1 Drawing Sheet

METHOD FOR SYNCHRONIZATION OF A CONTROLLER

TECHNICAL FIELD

This invention pertains generally to control systems, and more specifically to a method for controller fault recovery.

BACKGROUND OF THE INVENTION

Safety-critical control systems are increasingly being required, especially with the introduction of full by-wire braking and steering systems in vehicles. These systems need to be robust to controller faults wherein an error may result in loss of a critical vehicle function. Errors may be due to controllers that have temporary faults, or have been reset (e.g., due to a temporary power supply fault), or have drifted out of alignment because of a chaotic system, or wherein different sensor information has been caused by glitches at an input, or wherein there are temporary internal errors due to electromagnetic radiation in memory causing a state to be misrepresented.

One main requirement of these systems is to ensure no single point of failure exists, and as such multiple controllers and actuators are typically employed. Voting mechanisms are used to determine which output from the multiple controllers should be applied to control the system. A system with two controllers can be designed which compares the two outputs and shuts down when there is any discrepancy between the outputs. Three controllers are required for full redundancy with a voting mechanism normally selecting the median of the controllers' outputs for control. When a fault occurs in a controller in such a system, normally it is typically shut down for the remainder of the system operation and, subsequently reintroduced when the system is restarted or re-initialized. This may leave the system operating without sufficient fault-tolerance, even when the faults have subsided. This may not be an effective solution for cost-constrained systems, including automotive applications. Further, the reliability of the system significantly increases when a controller is recovered on-line rather than waiting until the end of an operating cycle to reintegrate it. This problem is especially important since studies have shown that transient faults are likely to occur 5 to 100 times more frequently than permanent faults.

The process of bringing a controller back on-line with correct functional states in real-time is referred to as reintegration. There exist numerous methods to reintegrate controllers. One approach uses hardware-assisted recovery techniques. However, such systems require additional hardware, focus on transient memory faults, and are not efficient in managing transient faults that temporarily cause an entire controller to reset. Another method to reintegrate the controllers requires transmission of the entire controller state information from one of the other controllers, typically in real-time. This approach has a number of potential drawbacks. Additional communication overheads are required to transmit the controller state information that may introduce bus or communication errors. The controllers need to be transitioned to a different mode to transmit this information which may trigger faults in the remaining working controllers at a time when correct operation is critical.

Therefore, what is needed is a method to reintegrate a controller into a control scheme that addresses the foregoing concerns.

SUMMARY OF THE INVENTION

The present invention comprises a method for controller reintegration by synchronizing the output of the primary controller with outputs of the secondary controllers, comprising a self-correcting controller that updates and adapts controller states, thus enabling bringing the controller operation back on-stream in a seamless and simple manner. The invention comprises a passive reintegration mechanism without active intervention of other correctly functioning redundant controllers, thus reducing additional fault scenarios. As such, a system incorporating the invention does not require bursts of profligate communication or memory transfer from other controllers.

The controller needing reintegration is placed in a different mode of operation in which its output is not used in system control. A meta-controller is activated to drive the primary controller to the same states at which the secondary or redundant controllers operate. A controller executing more complex control algorithms have their own dynamic states associated therewith. These are typically required to provide information that cannot be obtained at a single instance of time, such as an integral of error. The controller is considered a dynamic system, and meta-controllers can be designed to control these.

When a fault occurs in a controller, its states are typically reset to zero upon re-initialization. A system is required that forces the states to required values (i.e., the values determined by the other controllers) as quickly as possible. This is the responsibility of the meta-controller. The primary controller is considered the plant whose output and states are controlled through the use of the meta-controller in order to bring its behavior closer to the secondary controllers.

Therefore, in accordance with the present invention, fault-tolerant control system and method are offered, comprising a primary controller and first and second secondary controllers, each operable to determine an output based upon an input signal. A voting mechanism is employed which is operable to determine an output to a controlled device based upon the outputs of the controllers. A computer program comprising a method to synchronize the primary output and the secondary outputs is executed, comprising, first, effecting control of the controlled device using the secondary outputs. This action permits the primary controller to recalculate the primary output, based upon the primary output from the primary controller; a feedback signal from the controlled device; and, the secondary outputs from the secondary controllers. Control of the controlled device using the primary output is permitted when the primary output is within an allowable range of the secondary outputs.

An aspect of the invention includes the method to synchronize the primary output and the secondary outputs being executed based upon feedback from the voting mechanism.

A further aspect of the invention comprises the voting mechanism is operable to determine the output command of the primary controller is outside the allowable range.

Another aspect of the invention comprises the voting mechanism being an algorithm resident in each controller.

Another aspect of the invention comprises the voting mechanism being an algorithm resident in a separate controller.

Another aspect of the invention comprises the voting mechanism being an algorithm resident in the device.

Another aspect of the invention comprises the first, second, and third input signals being a common signal from a sensor.

Another aspect of the invention comprises the first, second, and third input signals each being independent signals from first, second, or third redundant sensors.

Another aspect of the invention comprises each output being a linear signal, a pulse-width modulated signal, or a discrete signal.

Another aspect of the invention comprises the primary controller, the first and second secondary controllers, and the controlled device each signally connected via a local area network.

Another aspect of the invention comprises the method to synchronize the primary output and the secondary outputs, including permitting the primary controller to recursively determine the primary output.

Another aspect of the invention comprises executing the method to synchronize outputs from the primary controller and the second controllers when a fault has occurred in the primary controller.

A further aspect of the invention comprises executing the method to synchronize outputs from the primary controller and the second controllers based upon a predetermined schedule.

A further aspect of the invention comprises effecting control with the device using the secondary outputs when a fault has occurred in the primary controller.

Another aspect of the invention comprises effecting control with the device using the secondary outputs when the primary output from the primary controller is substantially different from the secondary outputs.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
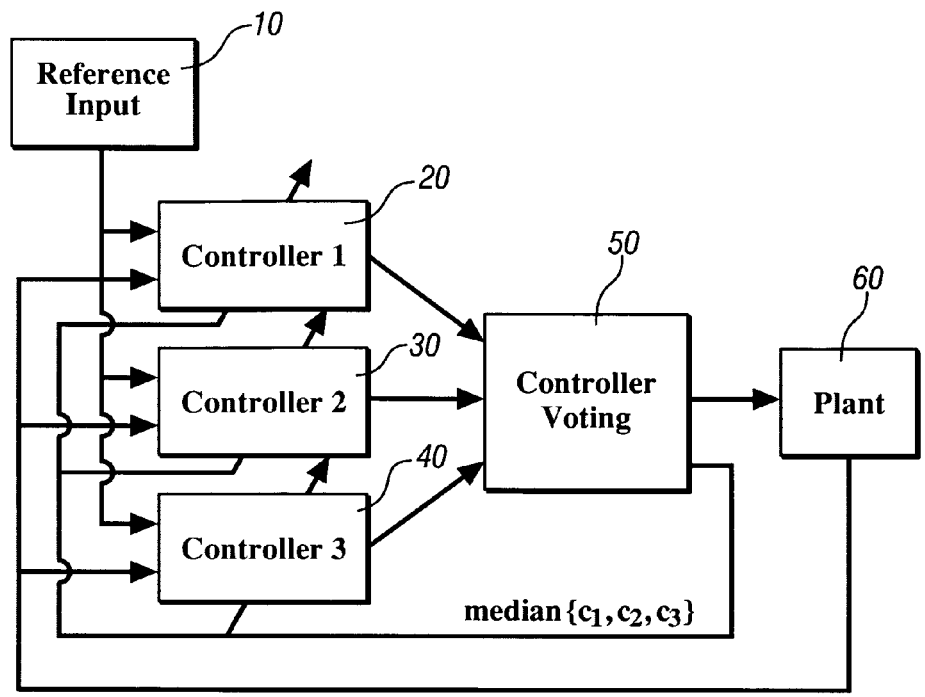
FIG. 1 is a schematic diagram, in accordance with the present invention.

Referring now to the drawings, wherein the showings are for the purpose of illustrating the invention only and not for the purpose of limiting the same, FIG. 1 shows a triple redundant controller architecture which has been constructed in accordance with an embodiment of the present invention. The triple redundant controller architecture comprises a fault-tolerant control system which is part of an exemplary integrated vehicle control system comprising a distributed control system wherein each controller is signally interconnected via a local area network ('LAN') throughout the vehicle to accomplish various tasks.

Referring again to FIG. 1, the fault-tolerant control system for the exemplary integrated vehicle control system preferably comprises a primary controller 20, and secondary controllers 30, 40, each having an output signal deliverable to a voting mechanism 50, the output of which is an input signal to device 60, to effect control thereof. The output from each controller 20, 30, 40 is determined based upon an input signal 10. The input signal 10 comprises a common input to each controller from a single sensor, or a common input to each controller from another controller. Alternatively, the input signal may comprise separate, independent inputs originating from multiple redundant sensors used to measure a common parameter. Feedback signals from the voting mechanism 50 and the device 60 are provided as input to each controller 20, 30, 40.

Each of the controllers 20, 30, 40 preferably comprises substantially identical devices executing substantially identical algorithms to accomplish an assigned task. The designation of controller 20 as 'primary' and controllers 30, 40 as 'secondary' is made for the sake of clarity only, and does not indicate any preferential treatment of that controller during operation. Each of the aforementioned controllers 20, 30, 40 is preferably a general-purpose digital computer generally including a microprocessor or central processing unit, ROM, RAM, and I/O including A/D and D/A. Each controller has a set of control algorithms, comprising resident program instructions and calibrations stored in ROM and executed to provide the respective functions of each computer. Information transfer between the various computers is preferably accomplished by way of the aforementioned LAN.

Control algorithms in each of the controllers 20, 30, 40 are typically executed during preset loop cycles such that each control algorithm is executed at least once each loop cycle. Algorithms stored in the non-volatile memory devices are executed by the central processing unit and are operable to monitor inputs from the sensing devices and execute control and diagnostic routines to control operation of the respective device, using preset calibrations. Loop cycles are typically executed each 3, 6.25, 15, 25 and 100 milliseconds during engine operation. Alternatively, control algorithms may be executed in response to occurrence of an event.

The integrated vehicle control system is signally connected to the aforementioned sensors and other sensing devices, and operably connected to output devices to monitor and control aspects of vehicle operation. The output devices preferably include subsystems necessary for proper control and operation of the vehicle. The sensing devices providing signal input to the vehicle include devices operable to monitor vehicle operation, external and ambient conditions, and operator commands.

The fault-tolerant control system comprises primary controller 20, and first and second secondary controllers 30, 40, each operably or signally connected to device 60 via voting mechanism 50. The primary controller 20 is operable to calculate a primary output, and first and second secondary controllers 30, 40 are each operable to calculate secondary outputs, based upon input signals, The input signals comprise common input signals, or, alternatively, separate input signals from redundant sensors, as discussed previously.

Voting mechanism 50, comprising an algorithm operable to determine which of the primary and secondary outputs of the controllers is "true" (i.e., accurately represents the sensor signal, or, command signal) is executed. In one embodiment, the voting algorithm 50 is executed in each of the three controllers 20, 30, 40. Alternatively, the voting algorithm 50 may be executed in a fourth, separate controller. Output from the voting algorithm 50 is provided to the device 60. The voting algorithm 50 provides feedback which is input to each of the three controllers 20, 30, 40. An output from the device 60 is provided as input to each of the three controllers 20, 30, 40. Voting mechanisms are generally known to a skilled practitioner, and not discussed in detail herein.

Reintegration is preferably accomplished by synchronizing the output of the primary controller with secondary outputs of the secondary controllers, as described herein. In operation, synchronization of the primary output and the secondary outputs of controllers 20, 30, 40 is effected by determining that the primary output is corrupted or in need of correction. The determination that the primary output is in need of correction is a result of the feedback from the voting mechanism 50, indicating occurrence of a fault. Alternatively, synchronization of the primary output and the secondary outputs of controllers 20, 30, 40 is effected by some form of preventative maintenance algorithm which acts to regularly synchronize the primary and secondary outputs of controllers 20, 30, 40, in accordance with a predetermined schedule. In any event, when synchronization is enabled, the system operates to control the device 60 using the secondary outputs from the secondary controllers 30, 40. The primary controller 20, operating off-line, calculates the primary output, based upon the primary output from the primary controller 20, the feedback signal from the controlled device; and, the secondary outputs from the secondary controllers 30, 40. When the primary controller is a PI or PID controller, the primary output may be calculated recursively. The primary output from the primary controller 20 is subsequently used as an input for controlling the controlled device 60 when the primary output is within an allowable range of the secondary outputs from secondary controllers 30, 40.

In operation, the primary controller 20, when in need of synchronization or reintegration, is put in a different mode of operation in which its output is not used to control the device. A meta-controller, preferably resident in each of controllers 20, 30, 40, is activated in the primary controller 20, to drive the primary controller 20 to the same states at which the secondary controllers 30, 40 are operating. Controllers more complex than simple gains have their own dynamic states associated with them. These are typically required to provide information that cannot be obtained at a single instance of time, such as the integral of error, which leads to recursive calculations. Such controllers are considered as dynamic systems and meta-controllers are designed to control these.

When a fault occurs in primary controller 20, its states are reset to zero upon re-initialization. A system is required that forces the states to the required values (i.e., those of controllers 30, 40) as quickly as possible, which is accomplished by the meta-controller. The output and states of the primary controller 20 are controlled through the use of meta-controller 25 in order to bring its behavior closer to the other two system controllers 30, 40. The controller preferably comprises a dynamic system which reaches stable operation.

Dynamic operating conditions of the primary controller 20 are knowable from the secondary controllers 30, 40, thus ensuring a high level of confidence of the meta-controller's performance. Additional correcting inputs can be added anywhere within the system controller's dynamics. This is a major advantage over a general control system design wherein the input channels through which a system can be controlled are restricted, typically due to physical constraints.

Figure 2:
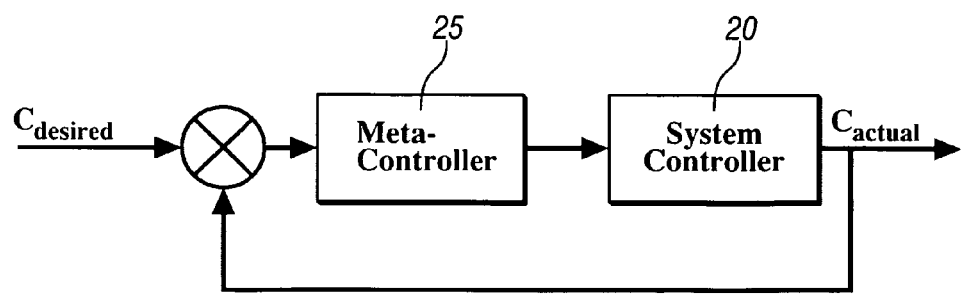
FIG. 2 is a schematic diagram of a control system, in accordance with the present invention.

Referring again to FIG. 1, the fault-tolerant control system is shown, with feedback path to each of the controllers 20, 30, 40, which is used by meta-controllers for primary controller synchronization and reintegration. Referring now to FIG. 2, the primary system controller 20 is considered as a dynamic system whose dynamics are completely known, and a suitable control algorithm can be applied to modify its dynamics, utilizing the meta-controller 25. In this control system, a difference between the desired command, $C_{desired}$, and the actual command, $C_{actual}$, is provided as input to feedback control scheme including the meta-controller, the output of which is used as input to the primary controller 20. The meta-controller 25 uses information from the two secondary controllers 30, 40 and from the device 60 being controlled. This includes is the correct or 'true' controller command, the system output or feedback, and the output from the primary controller 20. This information is applied to correct internal states of the controller 20 such that the output of the primary controller 20 matches the output of the secondary controllers 30, 40 in as short a time as possible. Each controller 20, 30, 40 in the total control system preferably includes an embedded meta-controller which acts as a state corrector for that controller's states. The embedded meta-controller's specific structure is dependent upon the type of primary system controllers that are employed and the correction algorithm that is employed.

The meta-controller is designed to provide a controller synchronization or reintegration strategy for the primary system controller in the event of occurrence of a fault. In one example, each of the three controllers 20, 30, 40 issues a respective command $c_1, c_2, c_3$ to the actuator or plant. The voting algorithm decides which of these signals is the 'true' signal to be applied to control the device 60. Various different fault scenarios may exist, including one of the controllers going out of electrical alignment due to ground path interruptions, a controller being reset due to transient or intermittent electrical power failure, or the output of one controller drifting compared with the other two controllers.

The exemplary control system comprises a proportional-integral primary controller of the form in Eq. (1):

$$C_i = k_p \cdot e + k_1 \cdot \int e \quad (1)$$

wherein $k_p$, $k_1$ are calibrateable controller parameters which determine the controller's performance. The term e comprises an error term, calculated as follows:

$$e = y_{desired} - y_{actual} \quad (2)$$

The error e is the difference between the desired system output and the actual system output, as measured at device 60. The controller has a single state comprising the integral of error, and through the rearrangement of Eq. (1), this can be found immediately.

$$\int e = \frac{C_i - k_p \cdot e}{k_I} \quad (3)$$

Since the error e and the controller output from the secondary controllers 30, 40 are available the primary controller 20 can, in this case, be reintegrated immediately. It is restarted using the value calculated in Eq. (3) as the initial condition for the integrator.

When the control system comprises a proportional-integral-derivative (PID) controller, it can typically be implemented in digital form of Eq. (4):

$$C = k_p + \frac{k_I T z}{(z-1)} + \frac{k_D(z-1)}{T z} \quad (4)$$

In this embodiment, $k_I$, $k_D$, and $k_P$ comprise calibrateable parameters which determine controller performance, and z represents the discrete transform. The derivative term is approximated, for example, by the difference between input signals at two adjacent sample times. A similar approach as shown with regard to the PI controller may be used, except that controller output can not be output to the controller until one sample time later, in order for the output from the integral information to be available. It should be noted that some of the digital forms of PID controllers are designed for smooth or bumpless transfer when switching between automatic and manual modes which can be considered as a related problem.

The PID control comprises the form shown in Eq. (5):

$$c_1 = k_1 e + k_2 \int e + k_3 \frac{de}{dt} \quad \text{Eq. (5)}$$

with $k_1$, $k_2$, $k_3$ being calibrateable parameters which determine controller performance.

The error, shown in Eq. (6) comprises a difference between desired system output, $y_{desired}$, and actual system output, $y_{actual}$.

$$e = y_{desired} - y_{actual} \quad \text{Eq. (6)}$$

This is modified, as follows:

$$e_1 = y_{desired} - y_{actual} \quad \text{Eq. (7)}$$

$$e_2 = C_{desired} - C_{actual} \quad \text{Eq. (8)}$$

wherein:

$$C_{desire} = \Delta = \text{median}\{c_1, c_2, c_3\} \quad \text{Eq. (9)}$$

and, error, e, is determined as follows:

$$e = \lambda e_1 + (1-\lambda) e_2 \quad \text{Eq. (10)}$$

wherein $\lambda$ comprises a variable between zero and one which determines the influence of the median, as determined in Eq. (9), on the control output. The objective of the controller is to stabilize the device 60 and to provide an accurate and fast control for tracking input.

The secondary output signal forces output of the primary controller 20 to quickly stabilize to a value determined by the secondary controllers 30, 40.

The controller output-voting algorithm preferably comprises an exponentially decaying signal which starts when an error is detected, or synchronization is initiated, and decays at a rate which reaches a low value when the primary controller 20 has stabilized. This is used to prevent another controller from having major corrective action while another controller is being stabilized. A pulse is decayed that is proportional to the distance the control signal is from the median value, as calculated in Eq. (9).

Thus, the fault-tolerant control apparatus comprises a plurality of redundant controllers operable to provide independently determined respective outputs to a voting mechanism. The voting mechanism is operable to determine a system control output based on the respective outputs and to determine which one of the plurality of redundant controllers is providing a respective output that is unacceptable. Each of the plurality of redundant controllers is operable to effect off-line operation of the one of the plurality of redundant controllers that is providing a respective output that is unacceptable such that during off-line operation the system control output is determined from the remaining ones of the plurality of redundant controllers. The respective output of the one of the plurality of redundant controllers operating off-line is recalculated based on the respective outputs of the remaining ones of the plurality of redundant controllers.

Embodiments of the system may be applied to various vehicle sensors, including for example a yaw rate sensor, a throttle position sensor, or brake/wheel speed sensors. Embodiments of the system may be applied to various vehicle control systems or actuators, including brake-by-wire, steer-by-wire, or electronic throttle control.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Fault-tolerant control system, comprising:
   a primary controller, operable to determine a primary output based upon a first input signal,
   a first secondary controller, operable to determine a secondary output based upon a second input signal;
   a second secondary controller, operable to determine a secondary output based upon a third input signal;
   a voting mechanism, operable to determine an output to a controlled device based upon the primary output and the secondary outputs; and,
   a storage medium having a computer program encoded therein for effecting a method to synchronize the primary output and the secondary outputs, the method comprising:
   a. effecting control of the controlled device using the secondary outputs;
   b. permitting the primary controller to recalculate the primary output, based upon: the primary output from the primary controller; a feedback signal from the controlled device; and, the secondary outputs from the secondary controllers; and,
   c. effecting control of the controlled device using the primary output when the primary output is within an allowable range of the secondary outputs.

2. The system of claim 1, wherein the computer program for effecting the method to synchronize the primary output and the secondary outputs is executed based upon feedback from the voting mechanism.

3. The system of claim 2, wherein the voting mechanism is operable to determine the output command of the primary controller is outside the allowable range.

4. The system of claim 1, wherein the voting mechanism comprises an algorithm resident in each controller.

5. The system of claim 1, wherein the voting mechanism comprises an algorithm resident in a separate controller.

6. The system of claim 1, wherein the voting mechanism comprises an algorithm resident in the device.

7. The system of claim 1, wherein the storage medium having the computer program for effecting the method to synchronize the primary output and the secondary outputs is resident in the primary controller.

8. The system of claim 7, further comprising the computer program for effecting the method to synchronize the primary output and the secondary outputs being resident in each of the secondary controllers.

9. The system of claim 1, wherein the first, second, and third input signals comprise a common signal from a sensor.

10. The system of claim 1, wherein the first, second, and third input signals each comprise an independent signal from first, second, or third redundant sensors.

11. The system of claim 1, wherein each output comprises a linear signal.

12. The system of claim 1, wherein each output comprises a pulse-width modulated signal.

13. The system of claim 1, wherein each output comprises a discrete signal.

14. The system of claim 1, wherein the primary controller, the first and second secondary controllers, and the controlled device are each signally connected via a local area network.

15. The system of claim 1, wherein the computer program encoded for effecting the method to synchronize the primary output and the secondary outputs, including permitting the primary controller to recalculate the primary output, comprises: permitting the primary controller to recursively recalculate the primary output.

16. Method to synchronize outputs from a primary controller with a first and a second secondary controller, each controller an element of a distributed control system comprising a plurality of controllers signally connected via a local area network, comprising:
- monitoring a primary output from the primary controller;
- monitoring secondary outputs from the first and second secondary controllers;
- effecting control using the secondary outputs;
- permitting the primary controller to recalculate the primary output, based upon: the primary output from the primary controller; a feedback signal from a controlled device; and, the secondary outputs; and,
- effecting control using the primary output when the primary output is within an allowable range of the secondary outputs.

17. The method of claim 16, wherein effecting control with the device using the secondary outputs further comprises effecting control with the device using the secondary outputs based upon an output of a voting mechanism.

18. The method of claim 16, further comprising executing the method to synchronize outputs from the primary controller and the second controllers when a fault has occurred in the primary controller.

19. The method of claim 16, further comprising executing the method to synchronize outputs from the primary controller and the second controllers based upon a predetermined schedule.

20. The method of claim 16, further comprising effecting control with the device using the secondary outputs when a fault has occurred in the primary controller.

21. The method of claim 16, further comprising effecting control with the device using the secondary outputs when the primary output from the primary controller is substantially different from the secondary outputs.

22. Fault-tolerant control apparatus comprising:
- a plurality of redundant controllers operable to provide independently determined respective outputs to a voting mechanism;
- said voting mechanism operable to determine a system control output based on the respective outputs and to determine which one of the plurality of redundant controllers is providing a respective output that is unacceptable;
- each of the plurality redundant controllers operable to effect off-line operation of the one of the plurality of redundant controllers providing a respective output that is unacceptable such that during off-line operation the system control output is determined from the remaining ones of the plurality of redundant controllers; and,
- the respective output of the one of the plurality of redundant controllers operating off-line is recalculated based on the respective outputs of the remaining ones of the plurality of redundant controllers.

* * * * *